United States Patent [19]

Masters et al.

[11] 3,813,797

[45] June 4, 1974

[54] MULTIPLE FILM VIEWER AND STORAGE CABINET

[75] Inventors: Cardinal M. Masters, Bethlehem; Willard H. Reed, Pen Argyl; Ralph H. Wentzell, Wind Gap, all of Pa.

[73] Assignee: A. M. Masters & Sons, Inc., Penn Argyl, Pa.

[22] Filed: Sept. 14, 1971

[21] Appl. No.: 180,258

[52] U.S. Cl. ............... 40/36, 40/78.09, 40/106.1
[51] Int. Cl. ............................................. G09f 11/32
[58] Field of Search ..... 40/32, 36, 78, 78.03, 78.07, 40/78.09, 106.1, 140, 156

[56] References Cited
UNITED STATES PATENTS

| 603,109 | 4/1898 | Lotz | 40/78 |
|---|---|---|---|
| 2,061,030 | 11/1936 | Heath | 40/36 |
| 3,359,669 | 12/1967 | Masters | 40/106.1 |
| 3,456,372 | 7/1969 | Shoenfeld et al. | 40/106.1 |
| 3,568,345 | 4/1971 | Grosse | 40/36 |

FOREIGN PATENTS OR APPLICATIONS

| 794,488 | 12/1935 | France | 40/140 |

Primary Examiner—Wm. H. Grieb
Assistant Examiner—Vance Y. Hum
Attorney, Agent, or Firm—Synnestvedt & Lechner

[57] ABSTRACT

An apparatus for storing and examining film transparencies, X-Ray films and the like including an illuminator having a viewing surface over which the film to be examined can be superimposed, a panel train having a plurality of film carrying panels, a panel storage region including two storage sections separated by the illuminator, one section above the illuminator and one section under the illuminator, two panel transfer trackways extending between the storage sections, one trackway in front of the illuminator and one trackway behind the illuminator, the front transfer trackway being positioned so that a panel carried thereon will lie in a plane parallel to the viewing surface; each storage section being adapted to store the panels in vertical parallel planes; and panel moving means adapted to move the panel train through the apparatus.

11 Claims, 16 Drawing Figures

MULTIPLE FILM VIEWER AND STORAGE CABINET

This invention relates to a motor driven apparatus for storing, handling, and viewing a plurality of sheet-like objects such as film transparencies, photographs, printed matter and the like. It is especially well suited for the storage, rapid selection and positioning for examination of a large number of radiographs (hereinafter usually referred to as X-Ray films) for diagnostic or interpretive purposes while minimizing the need for the busy radiologist to personally handle the films.

Units currently available for such purposes are relatively slow to operate; many are manually operated; some are fully motorized; and others are partly hand-operated and partly motor-driven. All present units have a fairly small capacity for the storage of films. The largest motorized units now on the market only have a capacity of 200 — 14 inches × 17 inches, thereby necessitating frequent periodic shutdown during the radiologist's prime time in order to permit the unit to be unloaded and reloaded. In addition, some of the present motorized multiple film viewers are exceptionally loud and noisy when in operation.

The principal object of this invention is to provide a compact, quiet, economical, motorized multiple film viewer that can store a large number of radiographs; can rapidly reach into the stored film file, retrieve and position a desired film at the viewing station.

Another object of this invention is to provide certain mechanisms that in combination cooperate in permitting close positioning and stacking of film carrying frames or panels within the unit and the precise synchronization and timing of the unit's operation to thereby enable the storage capacity of the unit (on both a square foot and cubage basis) to be greatly expanded.

It is still another object of this invention to provide a unique system for moving panels to and from storage into the viewing position.

Other objects and advantages of the invention will be apparent from a study of the drawings and the specification.

The foregoing objects and advantages are accomplished in accordance with this invention by providing an apparatus for storing and examining film transparencies, X-Ray films and the like comprising an illuminator having a viewing surface over which the film to be examined can be superimposed, a panel train having a plurality of film carrying panels, a panel storage region including two storage sections separated by the illuminator, one section above the illuminator and one section under the illuminator, two panel transfer trackways extending between the storage sections, one trackway in front of the illuminator and one trackway behind the illuminator, the front transfer trackway being positioned so that a panel carried thereon will lie in a plane parallel to the viewing surface; each storage section being adapted to store the panels in vertical parallel planes; and panel moving means adapted to simultaneously move:

1. a first panel from the first storage section to the transfer trackway in front of the viewing surface
2. a second panel from the transfer trackway in front of the viewing surface to the second storage section
3. a third panel from the second storage section into the transfer trackway behind the viewing surface, and
4. a fourth panel from the transfer trackway behind the viewing surface to the first storage section and wherein the panel moving means includes a prime mover coupled to a system for imparting vertical movement to panels engaged therewith and to a system for imparting horizontal movement to panels housed in each of the storage sections; the vertical movement system including a lift chain belt having a pair of chain paths extending from the upper storage section to the lower storage section by way of the panel transfer trackways, one chain path in front of the illuminator and one chain path behind the illuminator; each horizontal movement system including a traverse chain belt extending along the sidewall and having a straight horizontal trackline running from a front portion of the unit to a back portion of the unit, the lift chain belt and the traverse chain belts lying in parallel offset planes having crossing paths in the front and rear of each of the storage sections; each chain belt system having means adapted to carry a panel member when engaged therewith, said panel carrying means and the crossing paths of the panel movement systems being further adapted to provide for the transferring of a panel member between the horizontal and vertical panel movement systems at the points where the paths of the systems cross.

The invention can be more fully understood after a consideration of the detailed description which follows together with the accompanying drawing in which.

THE HOUSING

The multiple film viewer is housed in a cabinet — usually rectangular in shape. The principal components of the viewing unit are: a panel train 10 formed by a plurality of individual panel frames adapted to carry the films through the unit; an illuminator 11, a panel storage region that includes two panel storage sections 12 and 13 separated by the illuminator, and panel transfer trackways 14 and 15 extending between the storage sections. Although the unit can be constructed with the panel storage sections on either side of the illuminator, space utilization efficiency normally dictates a vertical arrangement of the type illustrated with one storage section positioned above the illuminator and the other storage section below the illuminator. These storage sections will generally be referred to as the "upper" (12) and "lower" (13) storage sections.

Figure 6:
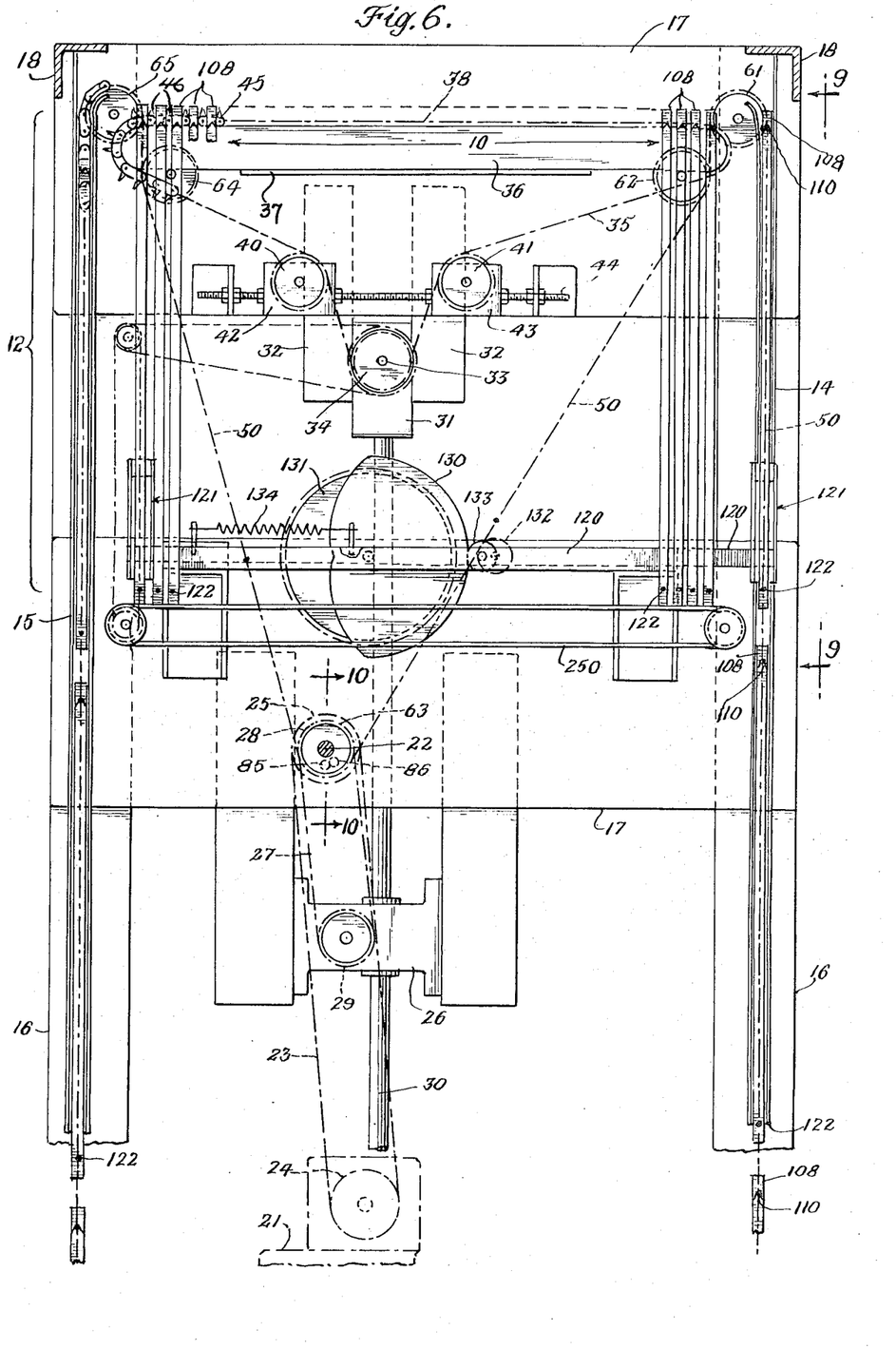
FIG. 6 is a somewhat enlarged view of the upper panel storage portion of FIG. 1.
Figures 6A, 7:
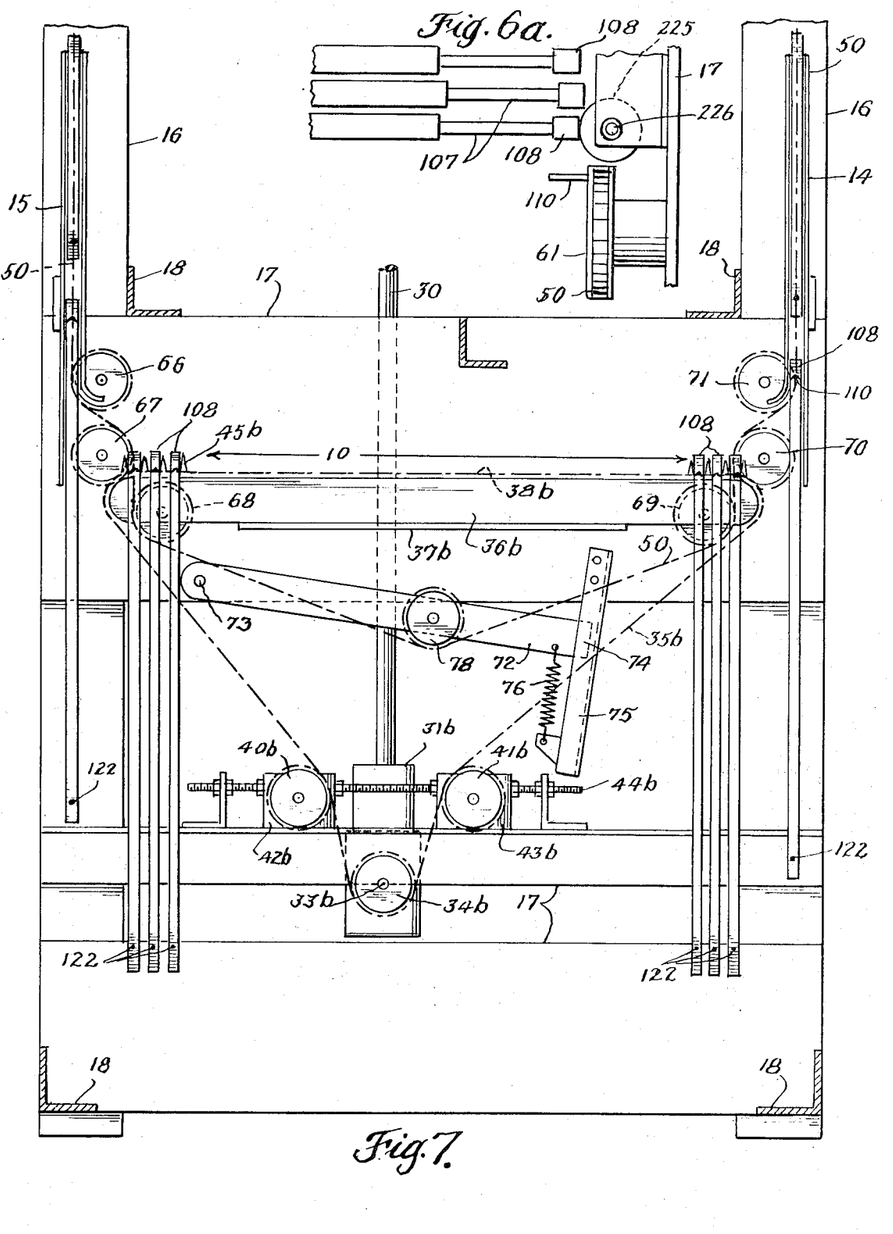
FIG. 6a is a fragmentary plan view of the panel frame centering and aligning mechanism in the upper storage section.
FIG. 7 is a somewhat enlarged view of the lower panel storage portion of FIG. 1.

The cabinet is suitably framed in by vertical angle framing elements 16, frame side members 17, and longitudinal angle iron stringers 18 (best seen in FIGS. 6 and 7). Preferably the top, the bottom, the sidewalls, the back wall of the unit and the front walls of the storage sections are covered with plywood, metal sheeting, or the like in order to enclose the unit and shield the moving mechanism.

In most units it is desirable to provide a table top working surface 19 in front of the illuminator. Operating controls for the illuminators and the viewer unit can be conveniently positioned in a control box 20 at the back of the table or other location, for example, foot operable controls 20a.

THE ILLUMINATOR

Details of the illuminator are not shown in the drawing since it can be any of the well-known film viewing devices that provide a source of light to illuminate the film, a common form being a box, generally rectangular in shape, with a translucent face 11a on or over which the X-Ray films can be superimposed. Internally disposed lighting means such as fluorescent tubes or incandescent bulbs provide the illumination. The illuminator is positioned within the unit with the viewing surface 11a positioned in a plane parallel and adjacent to the front vertical wall in close proximity but behind the front panel transfer trackway 14 that connects the forward portions of the upper and lower panel storage sections 12 and 13.

A preferred form of illuminator, however, is that disclosed in U.S. Pat. No. 3,359,669 (incorporated herein by reference), namely, one that has a translucent face upon which a film can be positioned for viewing. Spot illuminating means are mounted in the illuminator box and are movable within the cabinet to cast a spot of light on any one film positioned on the translucent face without shifting the position of the film. Such illuminator units also include general illuminating means mounted in the cabinet a spaced distance behind the translucent face in position to cast light generally uniformly on the translucent face.

THE MAIN DRIVE

A reversible motor 21 is the prime mover for the viewer and is mounted centrally within the unit behind the illuminator connected to the main drive shaft 22 that extends across the interior of the unit in an upper portion thereof behind the illuminator and is journaled in the sidewall framing members. A chain belt 23 connects the drive sprocket 24 of the motor to the sprocket 25 of the main drive shaft 22. Two panel movement systems are driven by the main drive shaft — one system imparting vertical movement to the panel train and the other system imparting horizontal movement to the panel train housed in the upper and lower storage sections.

THE HORIZONTAL MOVEMENT SYSTEM

The horizontal movement system can be seen in FIGS. 1, 6, 7, 8 and 9 and is intended to move the panel train horizontally in the upper and lower storage sections. In the preferred embodiment, a pair of reduction gears are suitably mounted to be driven by the main drive shaft in synchronization with one another and with the vertical movement system. One reduction gear 26 is mounted on each sidewall of the viewer and is driven from the main drive shaft 22 by a chain belt 27 and sprockets 28 (on the main drive shaft) and 29 (on the reduction gear). A shaft 30 driven at the reduced speed extends vertically through the reduction gear box, the upper end of shaft 30, is connected to a miter gear 31 mounted on angle irons 32 carried by a sidewall framing member 17. The miter gear as can best be seen in FIG. 9 translates rotational movement of shaft 30 about its vertical axis into horizontal rotational movement of shaft 33 and the drive sprocket 34 carried thereon; sprocket 34 rotating in a plane within the cabinet generally parallel to the sidewall.

A continuous traverse chain belt 35 is driven by sprocket 34, the belt passes over a guide bar 36 mounted on a bracket 37 (FIGS. 6 and 9) projecting into the cabinet housing from sidewall framing member 17 in the upper portion of storage section 12 above drive sprocket 34. Thus chain belt 35 moves in vertical plane parallel to the sidewall of the cabinet and the portion of the belt 35 supported by the guide bar 36 forms a straight horizontal trackline 38 running from the front to the back of the storage section.

To provide for proper tensioning and to facilitate timing alignment of chain belt 35, a pair of sprockets 40 and 41 are mounted to engage and bear against the chain in opposition sprocket 34. Sprockets 40 and 41 are pivoted on blocks 42 and 43 (FIG. 6) that can slide along a threaded horizontal rod 44 fixed relative to the sidewall frame. This arrangement permits varying the center-to-center spacing of the sprockets 40, 41 and permits lateral shifting of sprockets 40, 41 relative to drive sprocket 34. Tightening of the opposed nuts carried by rod 44 on either side of blocks 42 and 43 prevents shifting of the sprocket's position.

The chain belt 35 is provided with clip members 45 (FIG. 8) along its full length, each clip having a pair of fingers projecting outwardly from the chain and into the plane of the chain path of belt 35. The fingers are equally spaced along the full length of the belt and as will be described hereinafter are adapted to receive and engage elements projecting from the film carrying panel to cause the panels to move horizontally with and at the same speed as the chain 35.

In the drawings, the illustrated views of the horizontal movement system show the trackline of the system as installed on the right inner sidewall of the unit when the viewer faces the viewing surface 11a. In the preferred embodiment of the invention an identical reduction gear, miter gear and horizontal trackline arrangement is also positioned along the left inner wall of the upper storage section; the left and right tracklines are of equal length and are synchronized with one another; both tracklines are driven from the main drive shaft 22 and always operate in the same direction. Thus the synchronized horizontal tracklines can provide suspension support to opposite sides of a panel frame engaged thereby and carry the panel in a vertical plane either forward or backward in the storage section.

A similar arrangement is employed in the lower storage section to impart horizontal movement to the panel members stored therein. In the drawings the parts of the lower horizontal movement system that correspond to the parts of the upper horizontal movement system by the letter b following part number given to parts of the upper system thus 31b to 45b in the lower section correspond respectively to parts 31 to 45 in the upper section, and they operate in the same manner to move the panel frames along a horizontal path in the lower storage section.

THE VERTICAL MOVEMENT SYSTEM

The vertical lift system can be seen in FIGS. 1,6,7,8 and 9. It is intended to move the film carrying panels into and out of the upper and lower panel storage sections through trackways that extend between the storage sections — one of the trackways being in front of the illuminator and the other trackway being behind the illuminator. In the preferred embodiment the trackways extend in a straight vertical line; the front trackway connecting the front portion of the upper and lower storage section and the rear or after trackway connecting the back portion of the upper and lower storage sections.

In the illustrated embodiment a lift chain belt 50 is driven by a sprocket 63 riding on the main drive shaft 22 and is threaded along a continuous path that lies a parallel but offset from the path of the traverse chain 35 and 35b (see particularly FIG. 9) where it can be clearly seen that the path of chain 35 is inboard and parallel to the path of chain 50. The lift chain 50 is arranged so that it crosses the path of the traverse chains 35 and 35b at four transfer points 51, 52, 53 and 54 near the front and rear portions of the traverse chain tracklines, at which point panels can be transferred to the traverse chain from the lift chain, or from the lift chain to the traverse chain depending upon the direction in which the lift chain is moving at the crossing point. Thus at transfer 51 point if the lift chain is moving in a downward direction a panel carried by the lift chain will on approaching the transfer point be transferred to the traverse chain whose trackline is moving from the front to the back of the unit. However, if the lift chain is moving upwardly when at transfer point 51 the traverse chain will be moving from the front to the back of the unit and a panel on the trackline will be transferred to the lift chain.

In the illustrated and preferred embodiment, the vertical panel movement system includes the path formed by threading a lift chain 50 in a continuous path over a series of sprockets positioned as shown in FIGS. 1, 6, 7, and 8. Starting from and returning to a point "X" on the front transfer trackway 14 vertically aligned with the horizontal centerline of the viewing surface 11a of the illuminator, the lift chain 50 path has a straight line run to sprocket 61 that is mounted on a pivot axis somewhat above the level of the horizontal trackline 38 of the traverse chain 35 of the upper storage system. It should be noted that in moving from point "X" to sprocket 61, the lift chain 50 does not cross the path of the horizontal trackline 38 of traverse chain 35. At sprocket 61, the chain path changes direction and moves in a downwardly extending path that crosses trackline 38 at point 51. In order to maximize the storage capacity of the upper storage section it is desirable to have the lift chain path 50 cross the horizontal trackline 50 at right angles as near as possible to the forwardmost portion of the trackline 38. This is accomplished by passing the lift chain around sprocket 61 and onto a sprocket 62 that is mounted at a level below the horizontal trackline. The pivot axis of sprocket 62 being inboard and below that of sprocket 61 but the pitch line of sprockets 61-62 at the point of chain engagement on the outermost point with respect to sprocket 62 and the innermost point with respect to sprocket 61 lie on the same vertical line. Therefore the path of the lift chain crosses the horizontal trackline at right angles in a forward portion of the trackline.

In the illustrated embodiment the lift chain 50 extends downwardly from sprocket 61 to sprocket 63 on the main drive shaft 22. At sprocket 63, the lift chain path is redirected on an upwardly extend path to sprockets 64,65 pivoted on the cabinet sidewall in the upper rear portion of the storage section. Sprocket 64 being inboard and below the horizontal trackline 38 and the pivot point of sprocket 65; the sprocket 65 being above the horizontal trackline 38; the pitch line of the outermost portion of sprocket 64 and the innermost portion of sprocket 65 lie on a common vertical line that defines a lift chain path that crosses the horizontal trackline 38 at right angles in a portion of the trackline at the rear of the storage section 12.

At sprocket 65, the lift chain 50 changes direction by passing over the sprocket and starting on a downwardly extending run passing through the trackway 15 behind the illuminator 11 an without crossing the path of the horizontal trackline 38.

Alternately the functions of sprockets 62 and 64 can be combined and served by a single sprocket positioned between sprockets 61 and 65 and below the level of the trackline 38. Such arrangement will define a lift chain path in which the outer front and back runs do not cross the path of the horizontal trackline but the inner runs do cross the path of the trackline; such simplified arrangement, however, tends to reduce some of the storage capacity of the unit since it usually shortens the trackline of the traverse chain 35.

The downward after run of the lift chain 50 through trackway 15 extends to sprocket 66 positioned in the rear portion of the lower storage section. In the most simplified arrangement the run from sprocket 65 to sprocket 66 will cross the path of the lower horizontal trackline 38b. However, in order to simplify the timing and synchronization of the movement systems, it is desirable that tracklines 38 and 38b shall be of approximately equal length and move at the same speed. Therefore geometry of the system requires bringing the lift chain path inboard somewhat before it crosses trackline 38b at 53. This is accomplished by passing the chain through a series of sprockets 66–67–68; sprockets 66 and 67 being pivoted on a common vertical axis and sprocket 68 being below trackline 38b and inboard and below sprocket 67 — the innermost pitchline of sprocket 67 and the outermost pitch line of sprocket 68 being on a vertical line crossing an after portion of trackline 38b.

At the front of the lower storage section, the lift chain is preferably, and for reasons given above, threaded through a similar track of sprockets 69,70,71 arranged so that the lift chain runs from sprocket 69 to 70 and crosses a forward portion of trackline 38b; and from sprocket 71 the lift chain 50 returns to the starting point "X" through the forward trackway 14 thereby completing the circuit.

For a balanced system it is preferred to employ a pair of opposed lift chains; one chain being pivoted on congruent paths on each of the sidewalls of the cabinet, the paths of the lift chain belts running in planes offset but parallel to sidewalls.

To maintain uniform tension on lift chain 50 during operation and to minimize start-up shock, a spring biased idler 78 bears against the inner periphery of the belt. The tensioning can be accomplished by use of conventional biasing arrangements, but in the embodiment as illustrated in FIG. 7, the idler sprocket 78 is pivoted on arm member 72 which is in turn pivoted 73 on a side frame element 17. The free end 74 of arm 72 rides in a U-shaped channel member 75 secured to and projecting down from side frame element 17. A biasing spring 76 runs between 72 and the toe of the channel member 75.

THE HESITATION DRIVE

When the direction of panel train movement is reversed — particularly after prolonged continuous running in one direction, as, for example, during the loading and unloading of the unit, the chain belt systems will develop considerable slack, and unless such slack is taken up, the unit will be thrown out of synchronization and panel jams will frequently occur. To overcome this difficulty, a hesitation drive is employed whereby, upon reversing, the lift chain system will not be activated until the chain belts of the horizontal movement system have started to move. Many types of hesitation drive arrangements or timers can be employed for these purposes. In the illustrated embodiment (particularly in FIGS. 6, 10 and 11) a simple but highly effective hesitation drive assembly is shown.

Figures 9, 10, 11, 12, 13, 14:
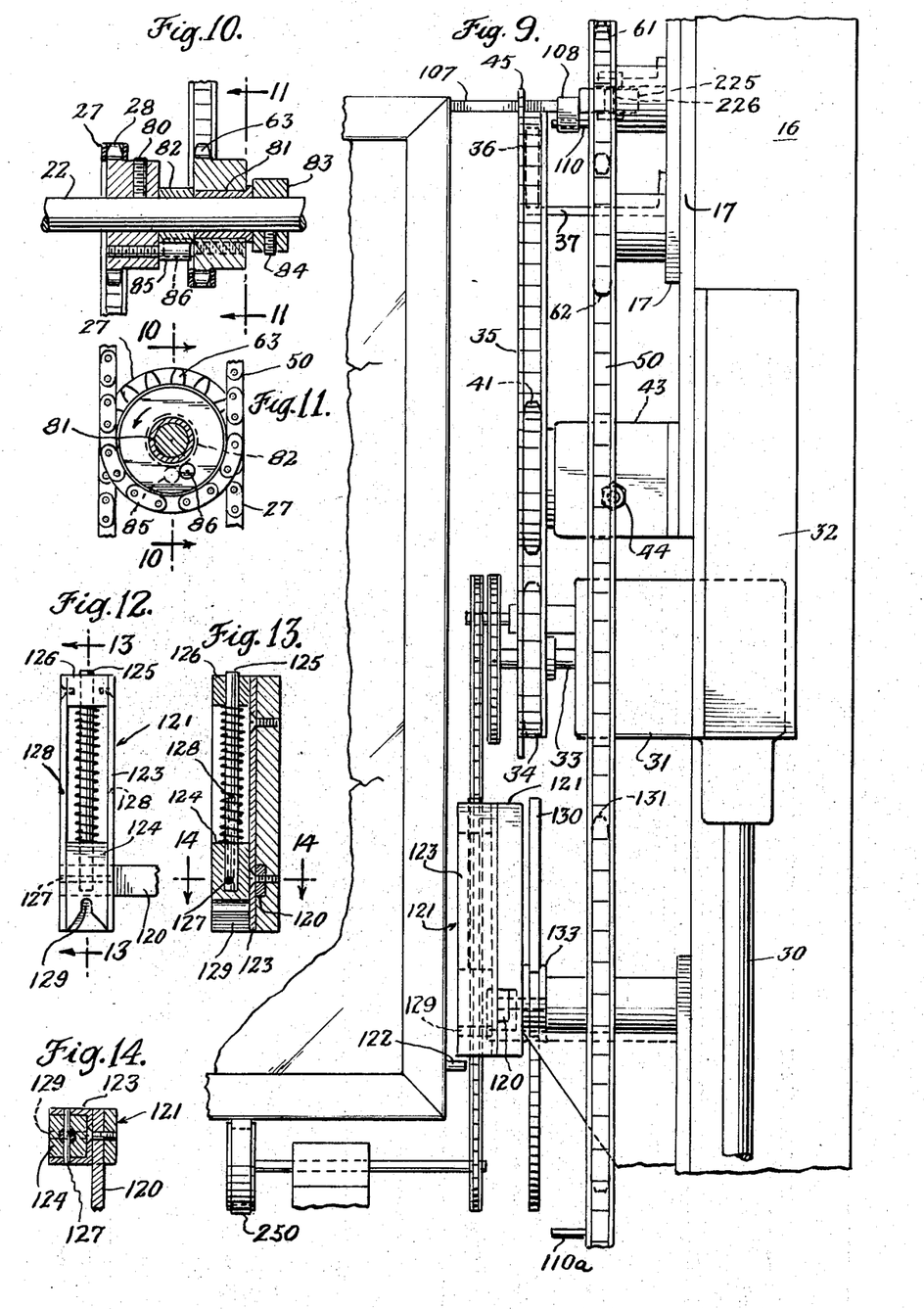
FIG. 9 is a fragmentary front view of the right hand upper portion of the apparatus, the view being taken as indicated by the lines 9—9 in FIGS. 6 and 8.
FIG. 10 is a cross section taken on the line 10—10 of FIGS. 6 and 11 illustrating a hesitation drive device employed in the apparatus.
FIG. 11 is a section taken on the line 11—11 of FIG. 10.
FIG. 12 is a detail view of a guiding device associated with the panels.
FIG. 13 is a cross section taken on the line 13—13 of FIG. 12.
FIG. 14 is a plan section taken on the line 14—14 of FIG. 13.

Sprocket 28 is fixedly mounted on the main drive shaft 22 by means of set screw 80. Sprocket 28 drives the reduction gear 26 through belt 27. Sprocket 63 rides freely on a shoulder bushing 81 carried on drive shaft 22. Sprocket 63 engages and drives the lift chain 50. Sprockets 63 and 27 are spaced apart on shaft 22 by sleeve 82 and the assembly held in position by collar 83 and set screw 84. A pin 85 is set in the face of sprocket 28 to extend into the space between sprockets 28 and 63 without rubbing the opposed face of sprocket 63. Pin 86 is similarly set in the face of sprocket 63 and projects into the space between sprockets 28 and 63 without rubbing the opposed face of sprocket 28. Pins 85 and 86 are radially positioned on the sprocket faces so that they will form a dog drive arrangement; as can be seen in FIG. 11, the drive shaft 33 is rotating in a counterclockwise direction, pin 85 is engaged with pin 86 so that sprocket 63 also is driven counterclockwise. On reversing the rotational direction of the drive shaft 22, pin 85 will disengage from pin 86 and sprocket 63 will be idle until such time as pin 85 again comes into contact with pin 86 after pin 85 has traversed almost 360° of arc in a clockwise direction. As is well understood, hesitation interval can be controlled by the appropriate positioning of a second dog pin in the face of sprocket 63 to shorten the arc through which the driving dog 85 must rotate before engaging the driven dog.

THE PANEL TRAIN AND PANEL UNIT

The viewer unit includes a train having a plurality of film carrying panels, the individual panel units move sequentially through the unit following the paths defined by the horizontal movement system and vertical movement system. At all times during movement the individual panels of the viewing surface will be in a vertical plane.

In the illustrated embodiment an approximately equal number of panels are in storage in the upper and lower storage sections, four panels are on the front trackway 14 connecting the upper and lower storage section and four more panels are on the after trackway 15. The panel moving means simultaneously move:

1. a first panel from the lower storage section to the transfer trackway in front of the viewing surface
2. a second panel from the transfer trackway in front of the viewing surface to the upper storage section
3. a third panel from the upper storage section into the transfer trackway behind the viewing surface, and
4. a fourth panel from the transfer trackway behind the viewing surface to the lower storage section. The panel train can also be moved in the reverse sequence, i.e., lowering the panels on the front trackway and raising the panels on the back trackway.

The panel details are shown in FIGS. 3,4,5,5a and 5b. These panels are configured to permit exceedingly close stacking in the storage section, to permit the panels to closely follow one another when suspended between the lift chains of the vertical movement system, and also to permit the trailing horizontal edge of a first panel to more readily clear the leading horizontal edge of the next panel on the lift chain as the first panel passes over the direction changing sprockets for transfer to the storage trackline. Thus, for example, in the prototype unit the panel frames are sufficiently thin to permit panels to be stored along the tracklines on one-half inch centers — 42 panels on top and 44 below — giving a total capacity of 94 panels in the unit. Although the panels are thin they have sufficient frame rigidity to prevent buckling that can cause panel jams as the panel train moves through the apparatus.

To facilitate film comparison and examination, radiologists generally prefer to have several radiographs simultaneously positioned over the viewing surface of the illuminator. The conventional X-Ray film is a 14 inches × 17 inches sheet and the usual arrangement desired by the radiologist calls for a four-over-four positioning of the films. Thus each panel unit should have a viewing surface that can carry four 14 inches × 17 inches films and the illuminator should be of such a size that two film carrying panels can be simultaneously superimposed over and illuminated by the viewing face. In general dimensions the individual panels are in rectangular units about 18 ½ inch in overall height, about 60 inches in overall length, and have a maximum thicknes of less than one-half inch. The invention, however, is not to be limited by these dimensions or to rectangular frame configurations.

Figure 1:
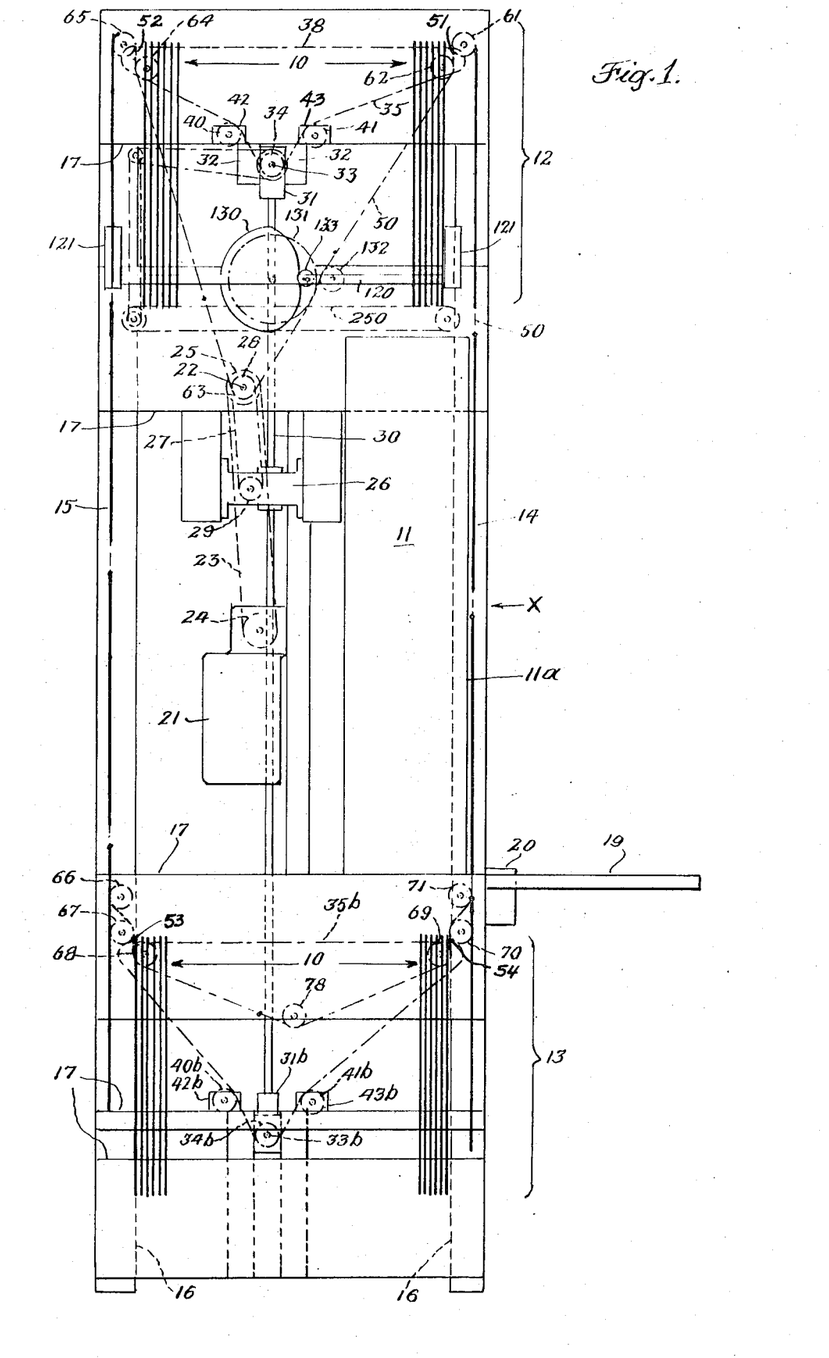
FIG. 1 is a more or less diagrammatic section elevational view of film viewing apparatus constructed in accordance with the invention with the viewing face of the apparatus appearing at the right of the figure.
Figure 2:
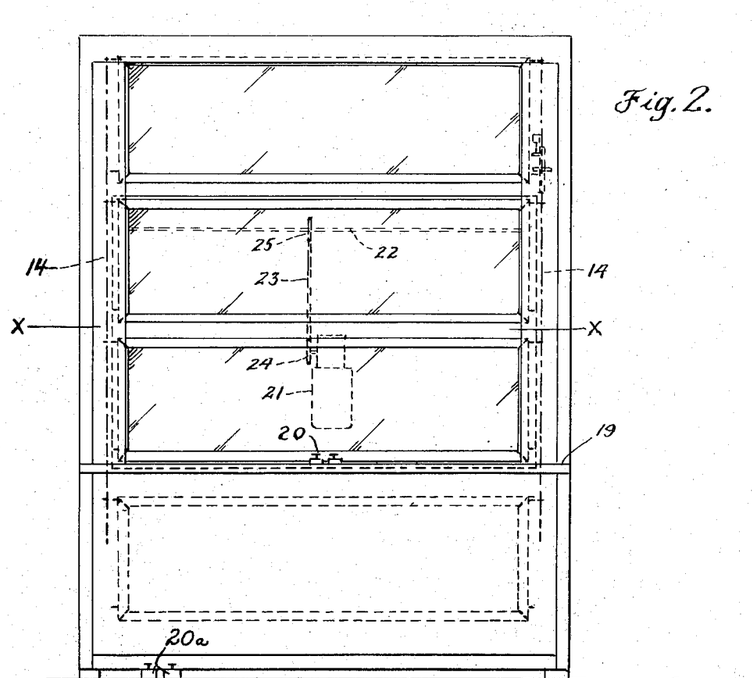
FIG. 2 is a front view of FIG. 1 on a somewhat reduced scale.
Figures 3, 4, 5A, 5B:
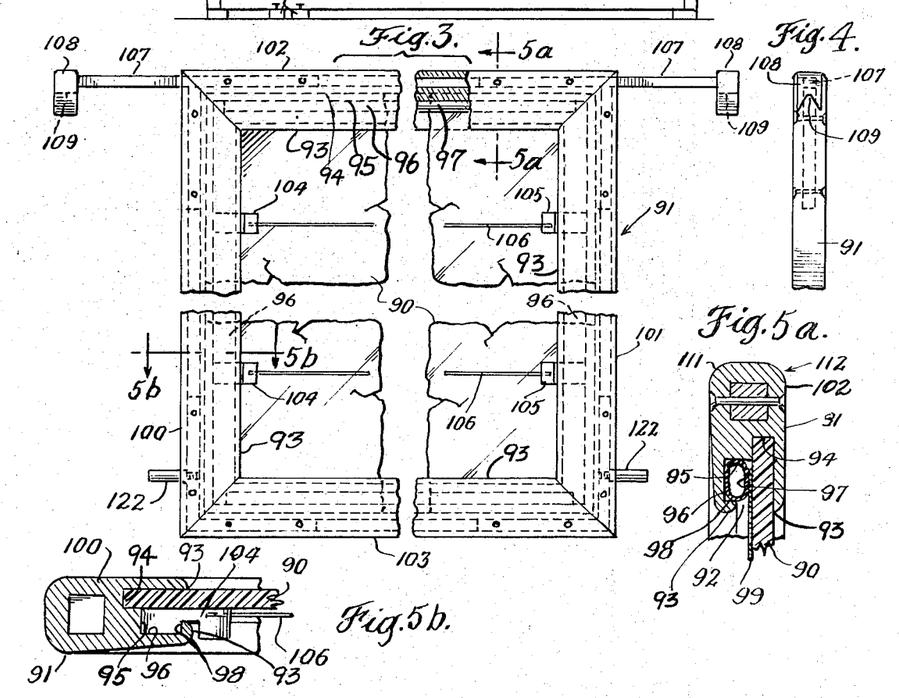
FIG. 3 is a broken out face view of one of the film panels of the apparatus.
FIG. 4 is an edge view of FIG. 3.
FIGS. 5a and 5b are enlarged cross sections taken on the lines 5a—5a and 5b—5b of FIG. 3.

As shown in FIG. 3 the panel unit includes a rigid transparent or translucent screen or window 90 upon which the film can be supported for transportation through the apparatus. Clear plastic viewing screens have been found to be entirely satisfactory for the examination of film transparencies, radiographs and the like where back lighting is provided by the illuminator. The screen 90 is surrounded by a frame 91. Where thinness and frame rigidity are required the frame can be made from extruded aluminum. Roller clips for holding the film against the viewing surface are usually disposed along the upper and lower edges of the frame.

Since such clips usually project outwardly beyond the plane of the frame, such arrangements cannot be employed where truly close stacking of individual panels is desired unless the depth of the unit is greatly increased. Therefore it is preferred to employ a panel in which the film holders will not project beyond the plane of the frame. One such holder is illustrated in FIGS. 5a and 5b; the frame 90 there illustrated has a longitudinal channel 92 extending on the inner peripheral edge 93.

One portion of the channel 94 is of substantial depth and the viewing screen 90 is nested in said deep channel portion. The channel also includes a second portion 95 that is of lesser depth than channel 94 and forming a chamber 96 adjoining the screen within the channel. A resilient, distortable cylinder of nonmetallic material such as, for example, plastic tubing of circular cross section is positioned in chamber 96. The tube has a larger diameter than the width of the chamber, therefore, it is distorted and compressed to form an oval-shaped element 97 when installed in the chamber. The channel is also preferably provided with a lip 98 extending over the cylinder holding channel portion a sufficient distance to retain the cylinder in the chamber. By this arrangement a sheet-like object such as a radiograph 99 will further mildly distort the compressed cylinder 97 when it is inserted between the screen and the cylinder and thereby develop sufficient force to hold the film against unintentional displacement.

The resilient cylinder need not run the full length of the channel; it can be positioned along the channel only at those points where it is desired to position the film or other sheet-like object. In most cases, however, it will extend from side 100 to side 101 for the full length of the channels in the top 102 and bottom 103 frame pieces. It can also run completely around the frame on all four sides of the frame.

Where, as in the case of the frame illustrated in FIG. 5, the distortable cylinder 97 is positioned only along the top 102 and bottom 103 frame pieces and the chamber 96 in the sidewall members 100 and 102 can be used as a slide track for one or more pairs of slide elements 104 and 105 that are interconnected by a thin metal or plastic retainer wire (thread, line, string or the like) 106 extending across the viewing screen 90 in very close proximity to the screen face. X-Ray films and other sheet-like objects inserted between screen face and the wire 106 will be held in a flat condition without buckling. For larger film sizes three or four retainer wires are desirably employed.

Each panel is provided with a pair of axially aligned extension arms positioned at or near the top edge 102 of the frame. The arms project outwardly from the frame and lie in the panel plane. Each arm is provided with a hanger block 108 or downwardly extending leg terminating in a downwardly opening slot 109, the opening of which runs in the same direction as the extension arm. The extension arms and hanger blocks provide an axis on which the panel can be suspended when engaged by the vertical and horizontal movement systems. Thus the arm portions 107 are dimensioned and positioned to be engaged by and held between fingers 46 of the horizontal tracklines. The hanger block slots 109 are arranged to be engaged by extension pins 110 carried by the lift chain 50. As can best be seen in FIG. 9, the extension pins 110 project from the lift chain 50 at equally spaced intervals on axes perpendicular to the plane of the lift chain path and extend toward the interior of the unit. The hanger block slots 109 and the lift chain extension pins 110 are so arranged that a pair of oppositely disposed extension pins will simultaneously engage hanger block slots of a given panel when such panel is moved by the traverse chain belts 35 into the path of upwardly moving lift chains and thereby lift the panel from the horizontal tracklines and carry the panel through the unit until the chain extension pins engaged with the hanger blocks across the path of a horizontal trackline in a downward direction, at which point the traverse chain belt 35 will receive the panel by engagement with the extension arm 107 thereby arresting further downward movement of the panel and the extension pins will automatically be separated from the hanger block slot.

To reduce the chances of jamming of the panel units when they are carried over direction changing sprockets by an upwardly running lift chain, it is preferred to have the leading and trailing edges 102 and 103 of the frame rounded both front 111 and back 112 rather than square. Such edge configuration also permits somewhat closer spacing of the extension pins 110. In no case, however, can adjacent extension pins 110 and 110a (FIG. 9) be any closer than the width (overall height) of the panel being carried thereon. Even where the rounded panel edge configuration is used there should be about a 1 ½ inch to 2 inch space between successive panels of the train when on the lift chain.

THE PANEL SHIFT BLOCK MECHANISM

In the illustrated embodiment of the invention, the panel members of the panel train are vertically suspended between the chain belts of the vertical movement system on an axis that runs generally along the top edge of the panel train. The lift chain moves at a much faster speed than does the horizontal trackline. In the prototype unit the lift chain/horizontal trackline speed differential is 40/1. The lift chain extension pins of successive panels are 20 inches apart and even though the frame elements are made as light as possible consistent with longitudinal rigidity requirements, the panel height from the trailing edge to the hanger block axis provides a long radius, and the inertia of the unit is such that the panel will swing about the hanger block axis when said axis passes rapidly over either of sprockets 61 or 65 in an upwardly reaching run. This swinging, unless restrained or dampened, is sufficient to cause the leading edge of the next succeeding panel on the chain to move into the swing path and jam the preceding panel.

Various means can be employed to overcome the swinging; however, because of the precise timing and synchronization of the panel movement systems it is preferred to physically restrain a lower portion of the frame before its upper edge starts up and over the direction changing sprockets 61 and 65 and to release the restraint just before the panel is transferred to the horizontal trackline or enter a downward trackway. One such swing restraining means is illustrated in the drawings — particularly in FIGS. 1, 6, 8, 9, 12, 13 and 14.

The swing restraining means nclude include cam actuated slide bar 120 mounted in the upper storage section for reciprocation along a line parallel to the trackline. Bar 120 slides in brackets fixed to frame sidewall elements and carries at each of its extremities a shift block mechanism 121 which when positioned in the space between the lift chain 50 and the side of a panel 101 that is being raised by the chain through trackway 14 (See FIGS. 8 and 9) will engage a coupling element (e.g. frame pin 122) that is secured to the panel frame well below the extension arm 107 axis.

The shift block mechanism, as can be seen in FIGS. 12-14, includes a U-shaped channel 123, a slider member 124, a spring biased piston 125 connected to the slider member at one end and passing through the channel and a guide block 126 that is secured at the top of the channel. The slider 124 is provided with a guide pin 127 riding in a retaining guideway 128 in sidewalls of the U-shaped channel. Such arrangement permits limited vertical sliding movement of the slider within the channel. The slider has a downwardly opening slot 129 preferably larger at the bottom and constricting in the upper portions to fit frame pin 122.

The shift block mechanism is mounted on the slide bar 120 so that piston 125 extends vertically and the open sides of the U-shaped channel and of the slider slot faces the interior of the cabinet.

The slide bar 120 is reciprocated horizontally so that the shift block mechanisms are periodically positioned in the planes of a panel unit being raised by the lift chain out of trackway 14 and of the next panel to be lifted from the rear of the horizontal trackline (or the converse sequence when the lift chain is running in a reverse direction). Reciprocating is effected by a suitably configured cam 130 and its coaxially mounted sprocket 131 that is maintained in driving engagement with lift chain 50 by the opposed idler sprocket 132. A cam follower 133 is pivoted on the slide bar 120 on one side of the mid-point and on the opposite side of the mid-point a biasing spring 134 connects an outer portion of the slide bar to a more central frame location thereby drawing and maintaining the cam follower 133 in contact with the cam 130 during the full cam cycle.

Figure 8:
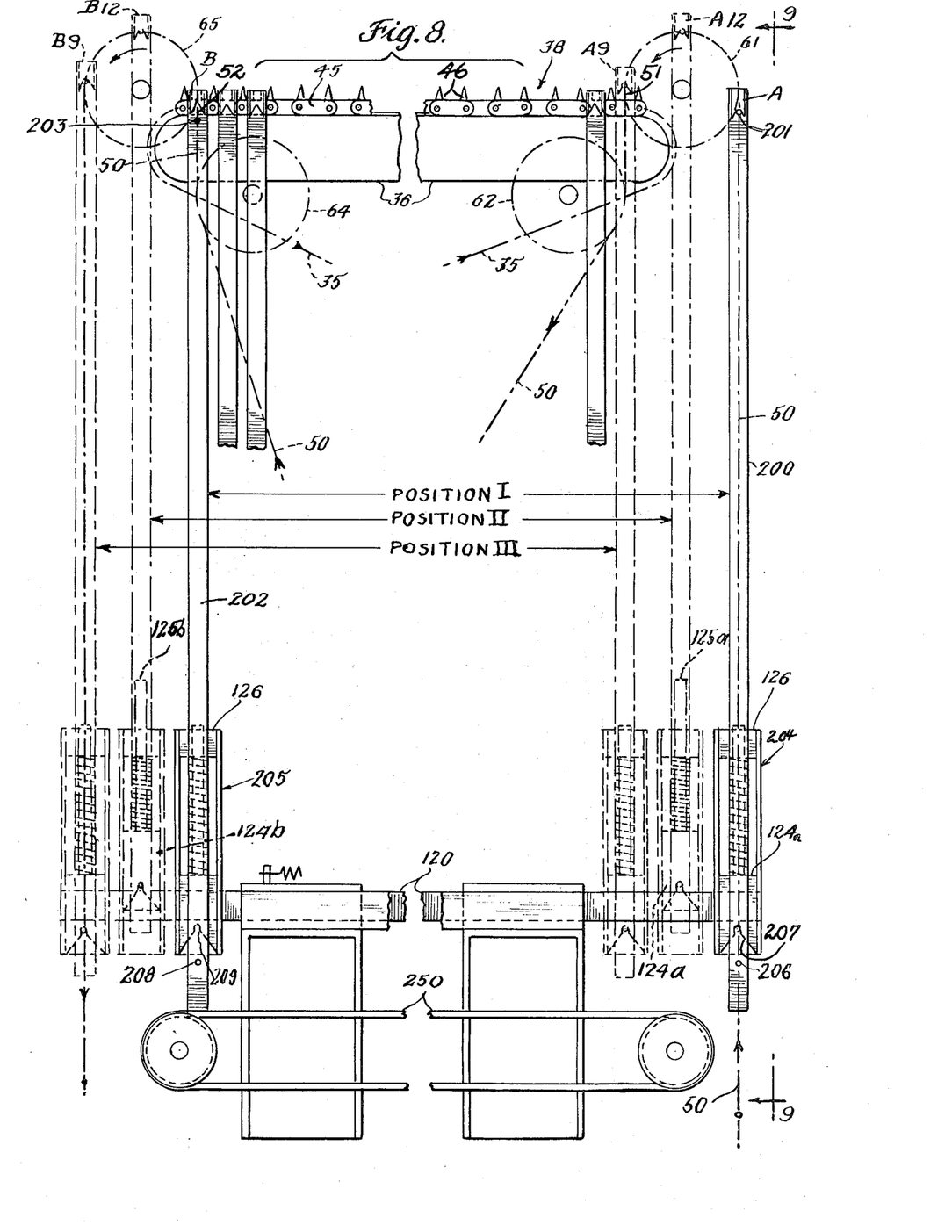
FIG. 8 is a further enlarged view, partly broken out, illustrating the sequential path of the panels as they progress in the upper storage portion of the apparatus.

The shift block operation can be seen in FIG. 8 wherein a first panel 200 is being raised through the front trackway by the lift chain 50 and the belt pin 201 is engaged with hanger block "A" and is rapidly approaching the front (3 o'clock) position of direction changing sprocket 61. A second panel 202 is on the horizontal trackline of traverse chain 35 slowly moving to the rear of the storage section and approaching transfer point where its hanger block "B" will be picked up by the chain belt extension pin 203 then being carried by the chain run from sprocket 66 to sprocket 65 in an upwardly extending path (i.e., pin 203 is approaching the 3 o'clock position of sprocket 65).

The slide bar 120 has been reciprocated to its forwardmost stroke Position I so that the front shift block mechanism 204 is aligned with the vertical plane of panel 200 and the after shift block mechanism 205 is aligned with the vertical plane of panel 202. Frame pin 206 has not yet entered slider slot 207 and frame pin 208 has not entered slider slot 209.

When chain pin 201 and hanger block "A" move to the 12 o'clock position (A12) on sprocket 61, frame 202 will have been picked off trackline 38 by lift chain 50 and pin 203 and hanger block "B" will also then be at the 12 o'clock position (B12) on sprocket 65; panel pins 206 and 208 will have by then been picked up by their respective slider slots 207 and 209; the slide bar 120 will have been reciprocated from Position I to Position II; the slider elements 124a and 124b will have moved vertically in their respective channels and compressed the biasing spring surrounding pistons 125a and 125b. During this movement the frame bottoms have been restrained by the combined action of the biasing springs and slider slots and the panels 200 and 202 are maintained in vertical alignment since the cam arrangement and shift block mechanism are so timed that frame pins 206 and 208 will follow (at the same speed) an offset parallel path corresponding to that followed by chain pins 201 and 203.

When chain pin 201 and hanger block "A" move to the 9 o'clock position (A9) on sprocket 61, pin 203 and hanger block "B" will also then have moved to the 9 o'clock position (B9) on sprocket 65. Frame 200 is about to be transferred from the lift chain 50 to the forward portion of trackline 38 to start moving back into the storage section. The slide bar 120 will have retracted to Position III, and in moving from 12 o'clock to 3 o'clock the shift block mechanism will continue to maintain the vertical alignment of the panel and the biasing springs surrounding piston 125a and 125b will gradually decompress, permitting frame pins 206 and 208 to follow (at the same speed) an offset parallel path to that of extension chain pins 201 and 203.

After frame 200 has been transferred to trackline 38 chain pin 201 will be disengaged from hanger block "A" and frame pin 206 will have been disengaged from the shift block mechanism 204.

The cam actuated slide bar-shift block mechanism will function in a reverse manner when the direction in which the lift chain 50 is reversed.

STORAGE RACK PANEL CENTERING

It is advisable to precisely center the panels that are suspended on the horizontal tracklines of the upper storage section. This is important to insure that chain pins 110 and the frame pins 122 will be properly aligned for engagement with the hanger blocks 108 and the shift block mechanisms 121 when the frame is transferred from the horizontal trackline to the lift chain.

In the illustrated embodiment this is accomplished by a simple device that can be seen in FIGS. 6a and 9, namely, an idler wheel 225 is mounted on a vertical pivot axis 226 supported by a horizontally extending bracket secured to the frame sidewall in the upper storage section in the vicinity of the points where the panels are transferred to and from the lift chains and horizontal tracklines. Thus there are four such idler wheels in each unit; two on the left and right sidewalls of the unit at the front of the unit at the rear of the horizontal trackline. The front and rear pairs of idler wheels are so spaced and aligned (horizontally and vertically) that one or the other wheels of cooperating pairs will be in the path of a panel frame and the thus engaged wheel will force the panel to a centered position providing proper pickup and transfer alignment.

Also to assist in maintaining vertical alignment of the panels and to minimize the swinging effect when the panels are suspended on an axis near their upper edges between a pair of horizontal tracklines, the unit can be provided with one or more rubber belts 250 suitably supported and running on a vertical belt path from the front to the back of the upper storage section. The upper run of the belt path being positioned to just engage the bottom edges of the frames on the storage rack trackline. The belt is suitably driven by sprocket and chains of the shaft 33 of miter box 31 and timed to move at the same speed and direction as its trackline.

The unit is well adapted for automatic panel selection and a programmed panel selector can be connected to the prime mover and counter means coupled with the panel train that can follow the movement of each panel through the circuit and so arranged that when a signal is sent for a particular panel, the prime mover is started, preferably in the direction that will bring the panel to the viewing station in the shortest time, at which point limit switches can stop the motor and center the selected panel on the viewing surface.

Because of the close stacking of the panels on the horizontal storage rack and the great speed differential between the lift chain system and the horizontal traverse chains, precise synchronization of the unit is essential if panel jams are to be avoided. The combination of features, however, specified herein permits panels to be stacked so closely that the unit can house almost twice as many panels (or films) as previous automated viewers (94 panels as against 50 panels in the same size cabinet) and at relatively little additional cost.

Further constructional details with respect to the panel frames are also disclosed in the patent application of Davydd M. James and Ralph H. Wentzell (one of petitioners herein) being filed simultaneously herewith and which has been accorded Ser. No. 180,286, now abandoned.

We claim:

1. Apparatus for storing and examining film transparencies, X-Ray films and the like comprising a housing having an upper storage section and a lower storage section, each storage section adapted to store film holding panel members in vertical parallel planes, an illuminator mounted in the housing between the upper and lower storage section, said illuminator having a viewing surface positioned in a plane parallel to the planes of the stored panels, a panel train having means to engage and carry the panels through the apparatus, said train having a horizontal movement system for moving the panels horizontally in each of the storage sections and a vertical movement system for transfering panels between the upper and lower storage sections and for sequentially superimposing individual panel members over the viewing surface, and means for driving the panel train including a reversible prime mover coupled to the vertical movement system and to the horizontal movement system; the vertical movement system including an endless lift chain belt having a front run and a rear run, said front run extending from the upper storage section to the lower storage section along a trackway in front of the viewing surface of the illuminator; and said rear run extending from the upper storage section to the lower storage section along a trackway behind the illuminator; means to connect the vertical movement system to the prime mover so that the movement direction of the lift chain belt will be reversed when the prime mover is reversed; the horizontal movement system including two endless traverse chain belts, one belt in the upper storage section and a second belt in the lower storage section, each traverse belt having an upper run that extends horizontally from a front portion to a back portion of the apparatus and forms a trackline for carrying the panels; means to connect the traverse chain belts in the upper and lower storage sections to the prime mover so that the trackline in the upper storage section and the trackline in the lower storage section move in opposite directions relative to one another and reverse their respective movement directions when the prime mover is reversed; the lift chain belt and the upper and lower traverse chain belts being mounted to move in paths that lie in parallel offset planes; the lift chain belt following a continuous path starting from and returning to a point on the front transfer trackway vertically aligned with the horizontal centerline of the viewing surface of the illuminator, said lift chain path having a vertical straight line run extending upwardly from the starting point to a first belt guide means positioned above the level of the trackline of the upper traverse belt without crossing the path of said trackline; at the first guide means the lift chain changes direction and extends downwardly in a run crossing, at a first point, a front portion of the path of the trackline of the upper traverse belt and leads to a second belt guide means positioned inboard of the first belt guide means and below the level of the trackline of the upper traverse belt at which guide means the lift chain changes direction and extends upwardly on a run crossing, at a second point, a rear portion of the path of the trackline of the upper traverse belt and leading upwardly to a third belt guide means positioned above the level of the trackline of the upper traverse belt, at the third belt guide means the lift chain changes direction and runs to a fourth belt guide means positioned below the level of the path of the trackline of the lower traverse belt, in the run from the third guide means to the fourth guide means the lift chain does not cross the path of the trackline of the upper traverse belt but crosses, at a third point, a rear portion of the path of the trackline of the lower traverse belt, from the fourth guide means the lift chain changes direction and crosses, at a fourth point, a front portion of the path of the lower trackline of the lower traverse belt on a run that leads upwardly to the starting point to complete the circuit; each of the horizontal and vertical movement systems of the panel train having means adapted to engage and carry a panel member; said panel engaging and carrying means and the offset crossing paths of the vertical and horizontal panel movement systems enabling a panel carried by one of the movement systems to be directly transferred to and thereafter carried by the other movement system at each of the four points where the paths of the lift chain and the tracklines of the upper and lower traverse belts cross and also enabling the reversal of the direction of transfer between systems upon reversal of the prime mover.

2. Apparatus according to claim 1 wherein the vertical movement system includes two synchronized chainbelts having congruent parallel paths, one belt being disposed on each sidewall of the unit and the horizontal movement system in each storage section includes a pair of synchronized traverse chainbelts, each pair having parallel horizontal tracklines of equal length and with one trackline extending along each of the sidewalls of the unit in both the upper and lower storage sections.

3. Apparatus according to claim 1 wherein the panels are rectangular frames having a transparent window for supporting the film to be examined, each frame having a pair of extension arms positioned at or near the top edge of the frame and projecting outwardly in the panel plane from opposite sides of the frame, each of said extension arms having a downwardly projecting leg terminating in a downwardly opening slot running in the direction of the extension arms; the lift chainbelts being provided with extension pins positioned at intervals along the chain no closer than the overall panel height, said extension pins projecting from the lift chain on axes perpendicular to the plane of the lift chain path and extending toward the interior of the unit, and wherein the slots of the extension arms and the lift chain extension pins are arranged so that a pair of oppositely disposed extension pins will engage the slots of the opposed extension arms of a given panel when the panel unit is moved by the traverse chainbelts into the path of the rising lift chains and thereby lift the panel from the horizontal trackline, thereafter the lift chains will continue to carry the panel until the chain extension pins engaged with the slotted extension arms cross the path of a horizontal trackline in a downward direction at which point the traverse chain will receive the panel by engagement with the extension arm, arrest further downward movement of the panel, disengage the chain extension pins from the slotted extension arms and start moving the panel horizontally through the storage section.

4. In apparatus according to claim 3 the improvement wherein means are provided to prevent the frame from swinging on the extension arm axis when an engaged panel is carried by the lift chain around the path of a direction changing sprocket.

5. Apparatus according to claim 4 wherein the swing preventing means includes a slide bar positioned at a level below the horizontal trackline of the upper storage section and mounted for reciprocation parallel to the horizontal trackline, said bar carrying at its extremities a shift block mechanism which when positioned in the space between the lift chain and the side of a panel that is being raised by the chain will engage a coupling element secured to the panel from below the extension arm, said mechanism being adapted to follow upward movements of the panel and wherein the retraction of the slide bar is synchronized with movement of the panel over the direction changing sprocket so as to move horizontally inboard at the same rate of speed that the panel top moves inwardly and thereby maintain the vertical alignment of the panel and prevent the panel from swinging back into the path of the lift chain as it is moved over the sprocket, said shift block mechanism being disengaged from the coupling element before the panel is transferred to the horizontal trackline.

6. In apparatus according to claim 1 the improvement characterized in that the prime mover actuates a main drive shaft, upon which two sprockets are mounted in close proximity and coupled to form a hesitation drive assembly in which one sprocket is connected to the drive mechanism of the lift chain system and the other sprocket is connected to the drive mechanism of a reduction gear which is in turn coupled to the horizontal movement system, the reduction gear drive sprocket being secured to the main drive shaft so as to rotate therewith and the lift chain drive sprocket riding freely on the drive shaft; the hesitation drive assembly providing for momentary inactivation of the lift chain drive upon reversing the prime mover so as to permit slack in the chain systems to be taken up before the lift chain starts moving in the reverse direction.

7. Apparatus according to claim 1 having means for centering the panel frames moving along the horizontal trackline as it approaches the position where it will be transferred to the lift chain.

8. Apparatus according to claim 1 wherein the individual panels include a rigid viewing screen, a resilient, distortable cylinder of non-metallic material, and a window frame having a channel therein, at least in those portions of the inner peripheral face of the frame adjoining the portion of the screen on which the sheet is to be held, one portion of the channel is of substantial depth and the viewing screen is firmly nested in said portion, the channel further having another portion of lesser depth than the screen-holding channel, whereby to provide a chamber adjoining the screen wherein the cylinder is positioned, said channel also having a lip extending over the cylinder-holding channel portion towards said screen a sufficient distance to retain the cylinder in the chamber, the combination being characterized in that the cylinder is of slightly larger diameter than the corresponding dimension of the chamber and is under compression when installed in the chamber, and in that the insertion of a film between the screen and the cylinder will mildly distort the compressed cylinder and thereby develop sufficient force to hold the film against unintentional displacement.

9. Apparatus according to claim 8 wherein the outer peripheral front and back edges of the top and bottom frame elements are rounded.

10. Apparatus according to claim 1 wherein the prime mover is connected to and started and stopped by automatic panel selector means programmed to run the panel train until a desired panel has been moved into position for viewing.

11. Apparatus according to claim 1 wherein the illuminator comprises a cabinet having a translucent face on which film can be positioned for viewing, spot illuminating means mounted in said cabinet, said spot illuminating means being movable within the cabinet to cast a spot of light on any area of a film positioned on said translucent face without shifting the position of the film and general illuminating means mounted in said cabinet a spaced distance behind said translucent face in position to cast light generally uniformly on said translucent face.

* * * * *